United States Patent [19]
Kennedy

[11] Patent Number: 5,369,432
[45] Date of Patent: Nov. 29, 1994

[54] COLOR CALIBRATION FOR LCD PANEL

[75] Inventor: James K. Kennedy, Round Rock, Tex.

[73] Assignee: Minnesota Mining and Manufacturing Company, St. Paul, Minn.

[21] Appl. No.: 861,128

[22] Filed: Mar. 31, 1992

[51] Int. Cl.⁵ .......................... H04N 9/68; H04N 9/31
[52] U.S. Cl. .................................... 348/181; 348/189; 345/88; 345/153; 345/904
[58] Field of Search ............... 340/784, 793, 703, 701; 358/10, 63; 348/180, 181, 189; 345/904, 89, 88, 150, 153, 147, 148, 149; H04N 9/68, 17/02, 9/73, 9/31

[56] References Cited

U.S. PATENT DOCUMENTS

| | | | |
|---|---|---|---|
| 4,415,921 | 11/1983 | Mulvanny et al. | 358/10 |
| 4,701,786 | 10/1987 | Yamanaka | 358/32 |
| 4,745,461 | 5/1988 | Shirai et al. | 348/572 |
| 4,752,771 | 6/1988 | Katogi et al. | 340/702 |
| 4,772,948 | 9/1988 | Irvin | 358/10 |
| 4,791,415 | 12/1988 | Takahashi | 340/784 |
| 4,846,694 | 7/1989 | Erhardt | 434/365 |
| 4,868,668 | 9/1989 | Tavernetti | 358/10 |
| 4,907,862 | 3/1990 | Suntola | 350/345 |
| 4,942,458 | 7/1990 | Miyajima et al. | 358/29 |
| 4,944,578 | 7/1990 | Denison | 350/347 |
| 4,951,131 | 8/1990 | Lindahl | 358/10 |
| 4,963,978 | 10/1990 | Ueda et al. | 358/520 |
| 4,989,072 | 1/1991 | Sato et al. | 348/180 |
| 5,081,523 | 1/1992 | Frazier | 358/10 |
| 5,089,810 | 2/1992 | Shapiro | 340/793 X |

FOREIGN PATENT DOCUMENTS

| | | | |
|---|---|---|---|
| 0240971 | 10/1987 | European Pat. Off. | H04N 17/2 |
| 0316946 | 5/1989 | European Pat. Off. | H04N 1/40 |
| 0355627A2 | 2/1990 | European Pat. Off. | |
| 0394018 | 10/1990 | European Pat. Off. | H04N 9/73 |
| 2630282 | 10/1989 | France | H04N 9/73 |
| 3-227125 | 10/1991 | Japan. | |
| 2212361 | 7/1989 | United Kingdom | H04N 9/73 |
| 9111887 | 8/1991 | WIPO | H04N 9/68 |

OTHER PUBLICATIONS

Special Issue NAB 90–vol. 27, 1990, Tokyo 8JP. Takeshi Yoshida–"Multipurpose Pattern Generator for NTSC Video System".

Primary Examiner—Alvin E. Oberley
Assistant Examiner—Kara A. Farnandez
Attorney, Agent, or Firm—Gary L. Griswold; Walter N. Kirn; Jack V. Musgrove

[57] ABSTRACT

A presentation system uses a computer to store and transmit electronic images to a liquid crystal display (LCD) panel which rests on an overhead projector. The LCD panel includes a calibration circuit designed to correct discrepancies in the saturation levels of the three primary colors. The calibration circuit determines the digital values in a signal corresponding to a test pattern of maximum intensity for all three colors, and compares these values to predetermined theoretical values. The differences between these values are recorded as calibration constants and are used to correct the image signals transmitted from the computer. A remote control unit may be used to provide a stimulus to both the computer (to generate the test pattern) and the LCD panel (to execute the calibration process).

20 Claims, 4 Drawing Sheets

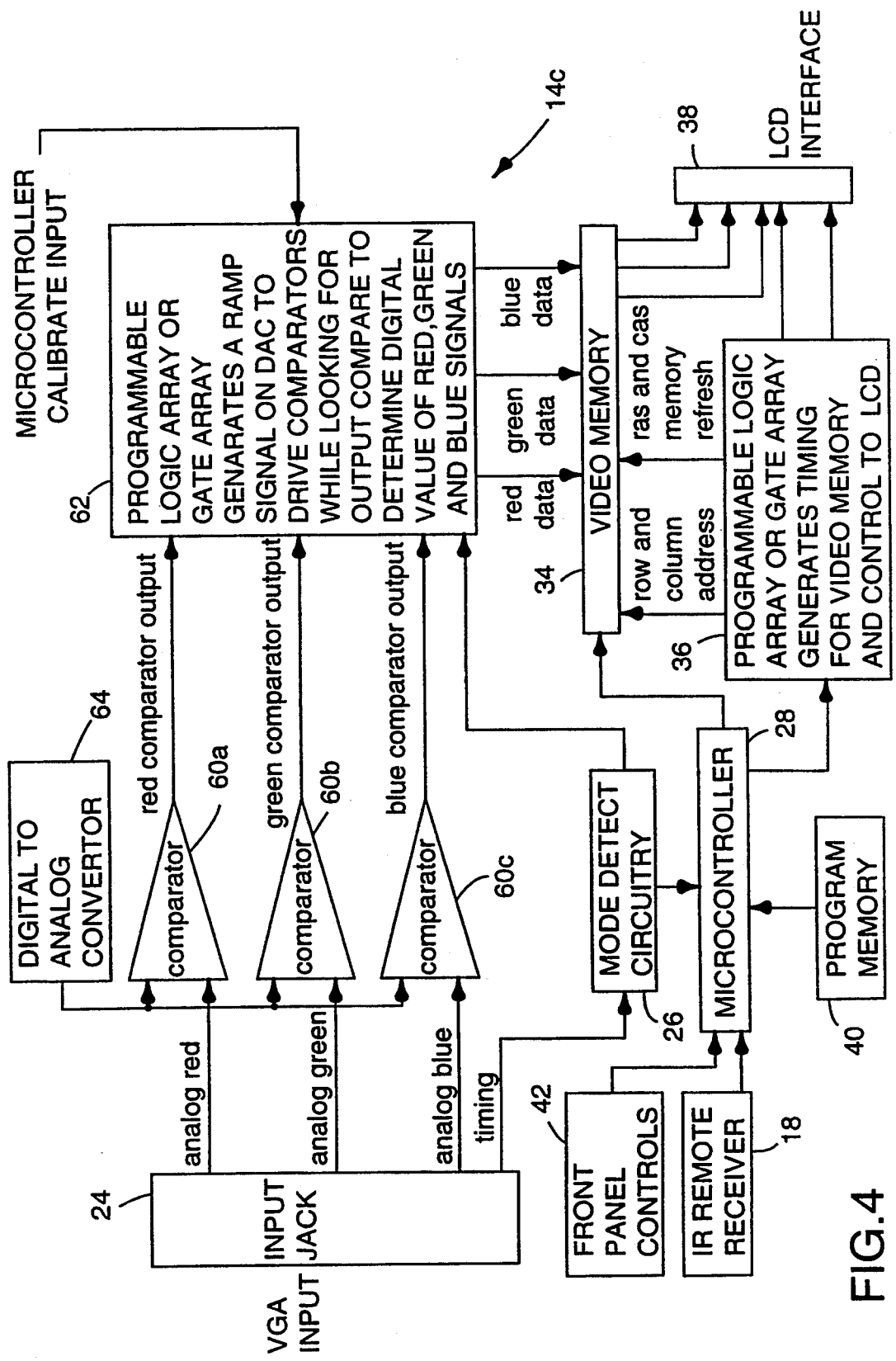

COLOR CALIBRATION FOR LCD PANEL

BACKGROUND OF THE INVENTION

1. Field of the Invention

The present invention generally relates to electronic video displays, and more particularly to a method and apparatus for calibrating the video output from a computer to optimize color contrast in a liquid crystal display panel.

2. Description of the Prior Art

Liquid crystal display (LCD) panels are known in the art and, in recent years, have increasingly been used in combination with overhead projectors (OHP's) to allow visual presentation of electronically stored graphic images. An exemplary LCD/OHP setup is shown in U.S. Pat. No. 4,846,694. In this conventional configuration, a controller (typically a personal computer) is used to create and store the graphic images. The LCD panel, which is placed on the stage area of the OHP, is electrically connected to the primary or auxiliary video output port of the computer.

The present invention relates to the use of LCD panels to display color (or gray-scale) images. Prior art devices have already overcome several problems in the presentation of color images. The first of these problems was the complete lack of an LCD panel which was even capable of display "true" colors, i.e., combinations of primary colors, either additive or subtractive. For example, the LCD panel disclosed in U.S. Pat. No. 4,944,578 is a "pseudocolor" panel, capable of displaying only certain color combinations such as yellow and blue, based on the birefringent characteristics of the liquid crystal medium. The control electronics for that panel map primary colors from the computer video output to selected colors available in the panel; the color gamut may be varied by changing the operating voltage of the panel, which affects the birefringent response of the panel.

Later LCD panels provided true color by either using primary color triads, similar to the pixel triads in conventional television screens (see, e.g., U.S. Pat. No. 4,791,415), or by providing a three-layer stack of LCD panels, each panel providing one of the three primary colors (see, e.g., U.S. Pat. No. 4,917,465). Other refinements in color LCD technology include: automatic adjustment of color depending upon ambient lighting conditions and (with respect to the spectral luminous efficiency of human eyes) the particular color being used (see U.S. Pat. No. 4,752,771); improved color convergence using synchronous adjustment of the transmission of primary color light gates (see U.S. Pat. No. 4,907,862); and manual adjustment of color contrast to overcome inherent transmittance responses (for each primary color) of the liquid crystal material (see U.S. Pat. No. 4,942,458).

One remaining problem which has not been adequately addressed by the prior art, and which is fundamental to proper color display, concerns the variable manner in which the output video signal is generated by different types of computers. This problem arises when the output is in analog form (the format used by a visual graphics array (VGA), as well as in SuperVGA, and XGA), although it does not occur when output is in digital form (the format used by a color graphics adaptor (CGA) and an enhanced graphics adaptor (EGA)).

In the analog system, there are typically five analog outputs: two clock signals (horizontal and vertical synch), and three analog signals, one for each of the primary colors, viz., red (R), green (G), and blue (B). The industry standard for this type of output (RS-343A) requires that the maximum signal level for a given color (corresponding to full saturation of that color) should be $0.7 \pm 0.01$ volts peak-to-peak. This analog value is then converted, by an analog-to-digital converter within the LCD panel, to a digital value. For example, in a 512 color display format, such systems typically use a three bit field (for each primary color) to define eight different shades. In other words, a converted, digital value of 000 corresponds to the minimum transmittance (i.e., no transmittance) of the primary color, while a value of 111 corresponds to the maximum color saturation.

Yet, in actuality, the output analog values vary considerably depending upon the particular computer being used to generate the output signals. Due to component tolerances, temperature variations, and product aging, some computers output a maximum signal level of only 0.5 volts, while others output a maximum level of 0.8 volts, while some computers output signal strengths varying within this range. In the former case (underdriving), the converted digital value will be less than the maximum, e.g., in a 512 color scheme, the maximum signal level of 0.5 volts might correspond to a digital value of 110 or 101, instead of 111. In such a case, an LCD panel will fail to provide full color intensity, resulting in poorer contrast and resolution. In the latter case (overdriving), the analog signal corresponding to maximum intensity will be converted to the proper digital value (e.g., the 0.8 volt signal will convert to a digital value of 111); other problems, however, arise in such cases of overdriving. There will be less differentiation between sequential color shades since the next level down in intensity might still result in a digital value of 111. In other words, a light gray shade will appear identical to the full white color on the LCD panel. Moreover, overdriving can affect the proper display of low intensity signals, e.g., a screen which should appear totally black might instead be dark gray.

Prior art LCD panels have incorporated manual adjustment controls, functioning much like the tint adjustment on conventional television sets, which allow the user to compensate for the foregoing effect. This is, nevertheless, a tedious manual operation, and it must be repeated each time the panel is connected to a different computer. Manual adjustment is also very subjective, and presenters will often differ on the settings required for optimum color contrast. Moreover, during a long presentation, changes in temperature (affecting both the computer and the LCD components) may cause the color quality to deteriorate, requiring further adjustment. Finally, several prior art LCD panels providing such manual adjustment allow only a single adjustment for all colors, i.e., they do not provide separate adjustment control for each of the primary colors. It would, therefore, be desirable and advantageous to devise a method and apparatus for simplifying calibration of color signals which is automatic and independent of the particular computer which is generating the video output signals.

SUMMARY OF THE INVENTION

The present invention is directed to a liquid crystal display panel having a color calibration circuit which automatically compensates for any deviations in the computer-generated output of color video signals destined for the LCD panel. When a test pattern is generated by the computer, the color calibration circuit analyzes the analog output signals or each primary color to determine if there is any variation from the standard anticipated signal levels. Any differences are recorded as calibration constants and are subsequently added to the signal values during the regular display operation. Alternatively, a feedback circuit may be provided to adjust the reference voltage of the analog-to-digital converter used to convert the analog signal color intensity values into digital values.

The test pattern generated by the computer may be a white screen (maximum intensity for each of the primary colors), or may comprise a series of screens, e.g., first a solid red screen, then solid green, and then solid blue. A peripheral device, such as an infrared receiver responsive to a remote control unit, may be used to provide a stimulus to both the LCD panel and computer for the calibration process, i.e., to cause the computer to display the test pattern and alert the LCD panel that the incoming signal is to be used for the calibration process.

Calibration may be augmented by generating another test pattern (a black screen) which provides a reference for the lowest possible intensity values. If reference signals are so provided for both minimum and maximum intensities, then the calibration function may use a multiplier in addition to any additive calibration constant.

BRIEF DESCRIPTION OF THE DRAWINGS

The novel features and scope of the invention are set forth in the appended claims. The invention itself, however, will best be understood by reference to the accompanying drawings, wherein:

FIG. 4 is a block electrical diagram of one embodiment of an LCD panel of the present invention which determines the digital values of the incoming signals using three comparators connected to a digital-to-analog converter, and adds a digital calibration constant to the digital values to calibrate the color intensity values of video signals corresponding to an electronic image

DESCRIPTION OF THE PREFERRED EMBODIMENT

Figure 1:
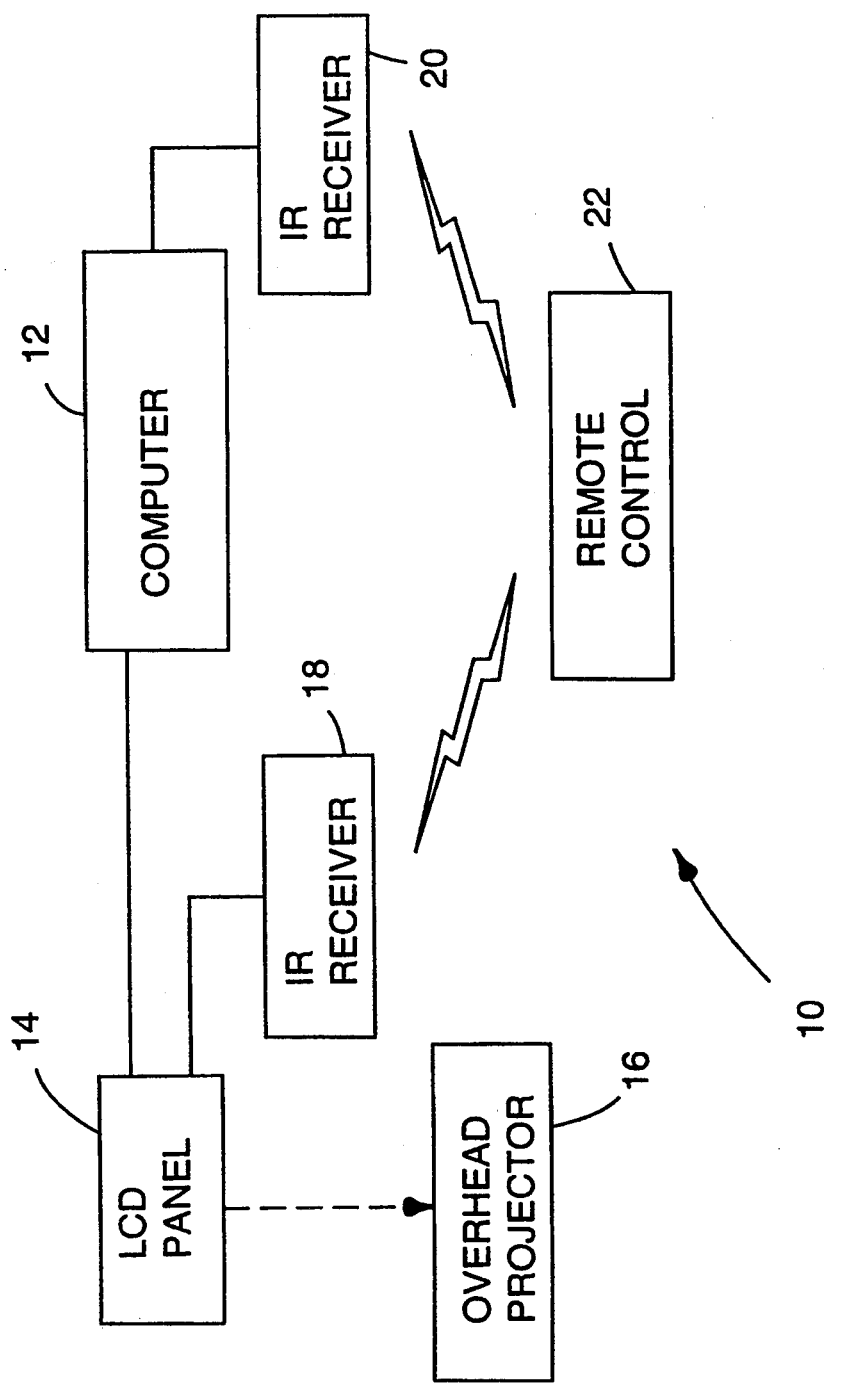
FIG. 1 is a block diagram of the general configuration of an LCD/OHP system as used in the present invention.

With reference now to the figures, and in particular with reference to FIG. 1, there is depicted the presentation system 10 of the present invention. Presentation system 10 is generally comprised of a computer 12 and a liquid crystal display (LCD) panel 14 which rests on the stage area of an overhead projector (OHP) 16. In the preferred embodiment, presentation system 10 also includes two infrared receivers 18 and 20 which are responsive to a hand-held remote control unit 22. As explained further below, receiver 18 is connected to LCD panel 14, and receiver 20 is connected to computer 12. The remote control system may take other forms besides infrared communication, e.g., radio wave transmission or wired remote.

Computer 12 may be used to generate, as well as store, the electronic images which comprise the visual portion of the presentation, and may be practically any kind of computer; it is preferably a personal computer which is compatible with either the IBM or MACINTOSH basic input/output systems (IBM is a trademark of International Business Machines; MACINTOSH is a trademark of Apple Computers, Inc.), and which provides video output in certain industry-accepted formats, including CGA, EGA, VGA, SuperVGA and XGA.

LCD panel 14 is similarly a conventional liquid crystal display panel (with the exception of the calibration circuits discussed further below). Panel 14 is preferably a full-color ("true" color) panel, such as the supertwisted nematic LCD panel sold by Minnesota Mining and Manufacturing Co. (3M—assignee of the present invention) under model no. 4800. Although the present invention is directed to such full-color panels, those skilled in the art will appreciate that the calibration schemes disclosed herein may be used with "pseudo-color" panels, and even with gray-scale (black-and-white) panels, albeit with less efficacy. Panel 14 may provide color by using stacked LCD designs, such as that shown in U.S. Pat. No. 4,917,465, or by using pixel triads, as exemplified in U.S. Pat. No. 4,791,415. Panel 14 may also be either passive matrix, using a conductive electrode grid, or active matrix, using thin-film transistors (TFT's).

OHP 16 is likewise a conventional overhead projector, preferably a high-intensity, transmissive-type projector such as that sold by 3M under model no. 955. Further details regarding the conventional elements of presentation system 10 may be found in U.S. Pat. Nos. 4,846,694; 4,942,458; and 4,944,578. It should be noted that the presentation system of the present invention may easily be modified for use with projection systems other than overhead projectors, e.g., rear projection television or video projectors.

Figure 2:
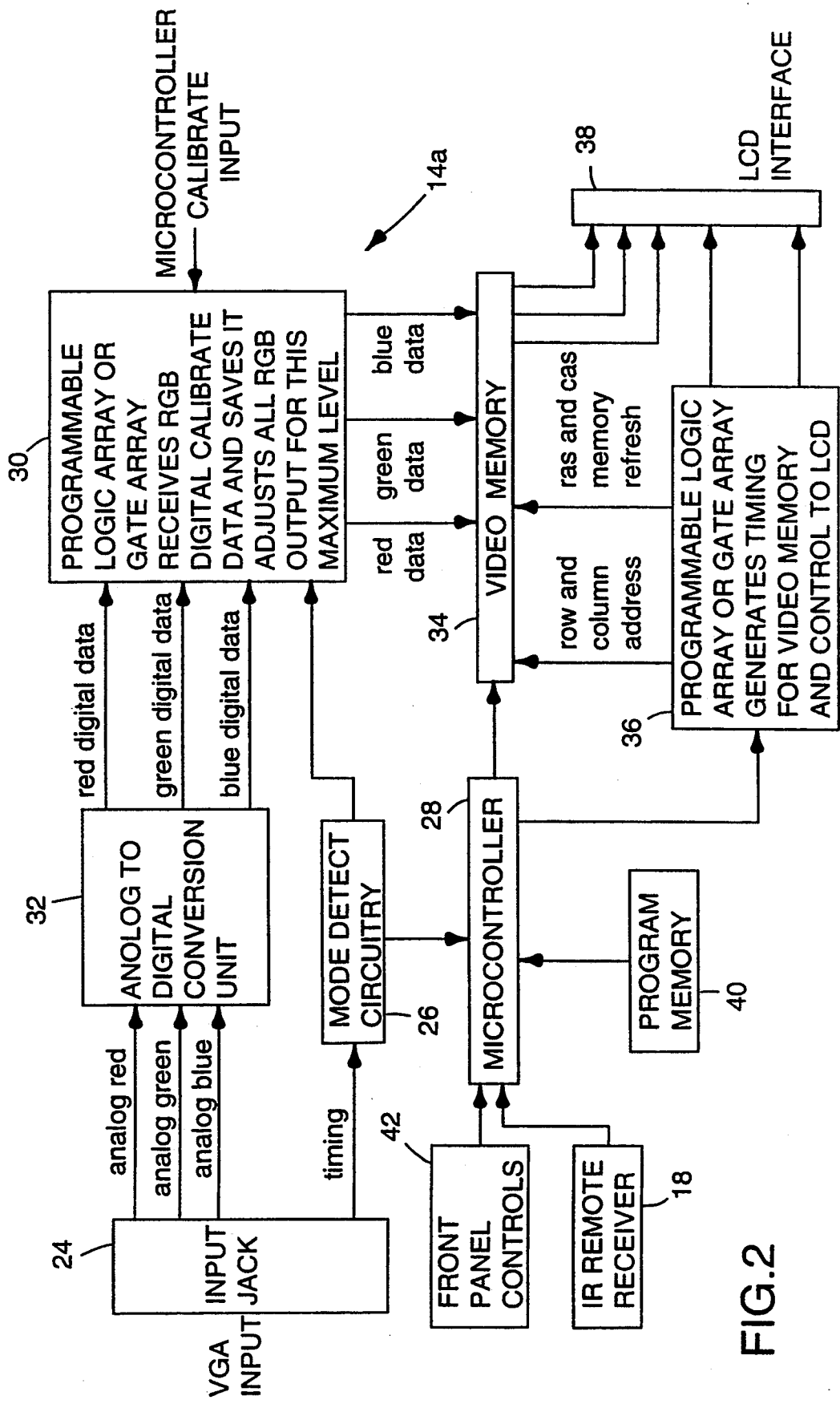
FIG. 2 is a block electrical diagram of one embodiment of an LCD panel of the present invention which adds a digital calibration constant to the output of an analog-to-digital converter to calibrate the color intensity values of video signals corresponding to an electronic image.

Referring now to FIG. 2, a block circuit diagram is depicted for the control electronics of an LCD panel 14a designed to digitally calibrate video signals which are provided in analog form. An appropriate connector, such as a DB15 jack 24, receives the cable from computer 12. For most analog formats, computer 12 typically outputs five video signals, two clock signals and three color signals, one for each of the primary colors red, green and blue. While these are additive colors, it is understood that the following discussion applies equally to calibration of the three subtractive primary colors, magenta, yellow and cyan. Also, the present invention does not require three physically separate transmission lines, i.e., all three color signals could be multiplexed onto a single line (this would require, however, a demultiplexer within the LCD panel). The timing signal, which serves to synchronize the color signals, is fed into a mode detection circuit 26. Mode detection circuit 26 analyzes the nature of the timing signal to determine the format of the video signals, e.g., VGA text format, VGA-CGA format, VGA-256 color format, etc., and passes on this information to a microcontroller 28, such as the 80C31 microcontroller available from Intel Corp. of Santa Clara, Calif. Mode detection circuit 26 also passes the timing signal to a first (programmable) logic cell array or gate array 30.

The three color components are directed to an analog-to-digital converter 32, which transforms the peak-to-peak voltages into digital values. As noted above, for a 512 color system, the digital value will vary in the binary range of 000 (lowest intensity) to 111 (maximum intensity). These digital values are loaded into the video random-access memory (VRAM) 34, via array 30. VRAM 34 acts as a frame buffer for the display electronics. A second logic cell array or gate array 36, connected to microcontroller 28, VRAM 34 and the LCD electrode interface 38 (i.e., the passive grid or active TFT's), is used to control the output from VRAM 34 to the LCD interface 38, which visually reproduces the electronically stored image.

Read-only memory 40 is provided to store the program instructions for microcontroller 28. A control panel 42 (i.e., a keypad which is located on the outer surface of the LCD panel) is also provided for a power on/off switch, and to impart other conventional features such as overall intensity adjustment. Control panel 42 may further include a calibration key.

The calibration operation begins by generating a predetermined test pattern, e.g., a white screen, on computer 12. Those skilled in the art will appreciate that there are several ways to generate such a screen by activating the graphics adaptor within computer 12 through appropriate software. When this pattern is generated, a reference signal (of maximum intensity) is created for each primary color. The presenter pushes the calibration key on control panel 42, which causes microcontroller 28 to send a calibration command to first array 30. Array 30 then compares the actual digital values for each reference signal to the theoretical maximum value (e.g., 111). The differences between the maximum value and the actual values become calibration constants, and may be recorded in either volatile or non-volatile memory. It is preferable to use non-volatile memory (e.g., electronically-erasable, programmable read-only memory) so that calibration need not be repeated if the same source (computer 12) is used at successive presentations. Thereafter, each digital value output from A/D converter 32 is adjusted by array 30, by adding the appropriate calibration constant for the particular color. The corrected values are then loaded into VRAM 34, resulting in improved color performance of LCD panel 14a.

Figure 3:
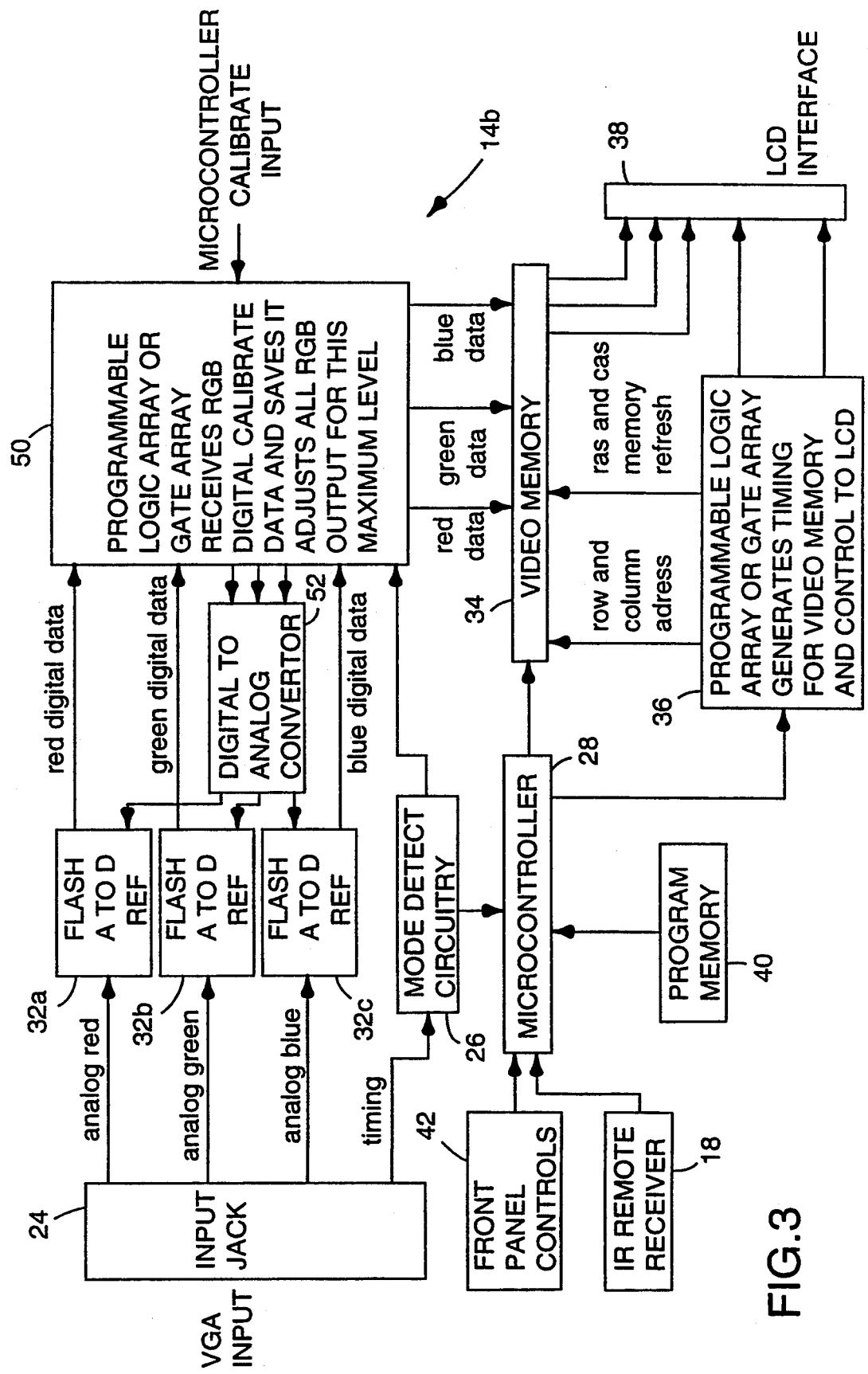
FIG. 3 is a block electrical diagram of one embodiment of an LCD panel of the present invention which uses an addressable digital-to-analog converter to adjust the reference voltages of three analog-to-digital converters to calibrate the color intensity values of video signals corresponding to an electronic image.

FIG. 3 is similar to FIG. 2, except that the LCD panel 14b of FIG. 3 is designed to calibrate the video signals using an analog feedback technique rather than digital correction. Several of the same components present in FIG. 2 are used in panel 14b, and have been labeled using identical reference numerals. In the configuration of FIG. 3, however, calibration is performed not by adding calibration constants to the converted digital values, but rather by providing three separate flash A/D converters 32a, 32b and 32c for each color, and by further adjusting the reference voltages for each of these converters.

As with the configuration of FIG. 2, LCD panel 14b is calibrated by generating a white screen and activating the calibration key on control panel 42. Each of the converters 32a, 32b and 32c provides a digital signal to another array 50, corresponding to the maximum intensity of a particular primary color. When array 50 receives the calibration command from microcontroller 28, it analyzes the digital values from the flash converters to detect any discrepancy in those values as compared to the theoretical maximum value. Array 50 then adjusts the output of each converter accordingly, by changing the reference voltage used by the converters. In the preferred embodiment, this is accomplished by utilizing converters having an external reference which is connected to a precision digital-to-analog converter 52 having at least three individually addressable outputs. Array 50 may then correlate the correction factors in a lookup table to adjust the reference voltages through D/A converter 52. Alternatively, array 50 may use the individual correction factors as direct inputs to D/A converter 52. This in turn changes (raises or lowers) the reference voltages for converters 32a, 32b and 32c, and thereby corrects any discrepancies in the video signal. The preferred D/A converter is sold by Analog Devices of Norwood, Me., under part no. AD7226. That converter provides an 8-bit data interface, a 2-bit address interface and a write-control line.

An alternative method of calibration is shown in the LCD panel 14c of FIG. 4. This design uses several comparators 60a, 60b and 60c to convert the analog signals to digital values. Another array 62 controls a D/A converter 64 (only one output required) which is connected in parallel to one of the inputs of each of the comparators. For each incoming signal, array 62 causes D/A converter to sequentially shift its output from a low level to a high level. Each of the comparators will output a 0 or low state until the output of D/A converter matches the level of the incoming signal. When there is such a match, the comparator outputs a 1 or high state, alerting array 62 of a proper match. Array 62 then records the digital value being output to D/A converter 64 as the intensity of the corresponding color signal, and writes this information to VRAM 34.

As with the previous embodiments, LCD panel 14c is calibrated by first generating the test pattern at the source, and by activating the calibration key on control panel 42. When array 62 receives the calibration command, it performs the same sequential procedure to determine the digital values of the incoming signals. These values are again compared to the predetermined maximum value, and any differences are recorded as calibration constants. Thereafter, when an image is being transmitted, array 62 adds the calibration constants to the signal values before it writes the data to VRAM 34.

Certain features may be added to the foregoing invention to further improve color performance of the LCD panel. For example, those skilled in the art will appreciate that the foregoing method may exhibit a detrimental effect with respect to the display of images have darker shades and colors, since the calibration constant will be added (or the comparator reference voltage will be raised) for all color signals, including low intensity signals. In other words, a black image would appear dark gray, or possibly tinted if the calibration constants were not the same for each color. In order to cure this side effect, the calibration operation may further include an analysis of a black screen, leading to a linear calibration function (with a multiplier in addition to an additive constant) which is performed by the logic cell array or gate array. For example, if the maximum digital value for a particular color was 101, but the minimum value was still properly 000, then it would be incorrect to simply add 2 to each incoming value. Use of a linear correction function, however, would have the following results: a received value of 000 or 001 would not be modified (i.e., calibration constant=0); a received value of 010 or 011 would be modified by adding 1; and a received value of 100 or 101 would be modified by adding 2. This scaling operation may be facilitated by the use of a digital signal processor in lieu of the logic cell array or gate array. Still more sophisticated methods (which will become apparent to those skilled in the art) could be provided to scale the input range to generate the full range of outputs.

Also, rather than providing a single test pattern, a sequence of test patterns may be used for calibration. Specifically, the computer may be programmed to generate three separate screens in sequence, namely, a fully saturated red screen, a fully saturated green screen, and a fully saturated blue screen, respectively. Microcontroller 28 would be programmed to instruct the array to separately analyze each color as it is transmitted. All of these screens would preferably be displayed for no more than a few milliseconds, which is long enough to perform the calibration process but short enough that the calibration screens are not even visible on the computer's CRT.

Finally, as alluded to above, presentation system 10 preferably includes a hand-held remote control unit 22. Remote control 22 provides those conventional features found in remotely operated LCD panels, and further duplicates the calibration key of control panel 42. In this regard, remote control 22 not only controls LCD panel 14, but also provides the stimulus to computer 12 to generate the test pattern(s), further simplifying the calibration procedure. This explains why two separate receivers 18 and 20 are required, although it would be possible to combine the two units into one. Computer 12 is preferably loaded with software (such as a terminate-and-stay-resident (TSR) program), which is responsive to a control signal from receiver 20. The remote control interface sold by 3M under model no. 825 may be easily modified to provide the foregoing functions.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. For example, the calibration circuit could be further modified to provide correction of the video signal values depending upon ambient temperature or the intensity of the light source (in the overhead projector) which is used to illuminate the image on the LCD panel. It is also conceivable that the invention could be used with display devices other that liquid crystal panels, e.g., plasma panels. It is therefore contemplated that such modifications can be made without departing from the spirit or scope of the present invention as defined in the appended claims.

I claim:

1. A method of correcting video output which is electronically transmitted from a source external to a display device, the video output including at three components corresponding to three colors, comprising the steps of:
   generating, at the source comprising interchangeable personal computers of different manufacture, a test pattern having three electrical signals corresponding to the three colors;
   determining the differences between a predetermined signal level and the signal level of each of the three color signals; and
   calibrating the video output by adjusting the video output based on each of the differences.

2. The method of claim 1 wherein said generating step is accomplished by sequentially generating the three color signals.

3. The method of claim 1 wherein said generating step is accomplished by simultaneously generating the three color signals.

4. The method of claim 1 wherein said generating step generates a test pattern having three primary colors.

5. The method of claim 1 wherein:
   the predetermined signal level and the three color signal levels are digital values;
   the differences are digital calibration constants, one for each of the three components of the video signal; and
   said calibrating step is accomplished by adding the calibration constants to the three components of the video signal, respectively.

6. The method of claim 1 wherein the three components are transmitted in analog form, and further comprising the step of converting analog values of the three components into digital values using three separate analog-to-digital converters each having an external voltage reference, said calibrating step being accomplished by varying the external voltage references based on said differences.

7. The method of claim 5 wherein the three components are transmitted in analog form, and further comprising the step of converting analog values of the three components into digital values using three separate comparators, each comparator having first and second inputs, the first inputs receiving the three analog components, respectively, and the second inputs being electrically connected in parallel to the output of a digital-to-analog converter, said determining step being accomplished by:
   sequentially increasing a digital input to the digital-to-analog converter to increase its output level until a given one of the comparators switches from a low state to a high state; and
   comparing the value of the digital input of the digital-to-analog converter, when the comparator so switches states, to the predetermined signal level.

8. The method of claim 6 wherein:
   said external voltage references of said analog-to-digital converters are electrically connected, respectively, to three addressable outputs of a digital-to-analog converter; and
   said step of varying the external voltage references is further accomplished by adjusting the level of the three addressable outputs of the digital-to-analog converter.

9. A device for visually presenting an electronically stored image based on electronic video output from an external source comprising interchangeable personal computers of different manufacture having three components in analog form, corresponding to three colors, comprising:
   means for converting analog voltage levels into digital values;
   correction means, electrically connected to said converting means, for (i) determining three digital reference values, one for each of the three colors, corresponding to three electrical reference video signals transmitted from the external source, respectively, (ii) recording the differences, respectively, between a predetermined digital value and said digital reference values, and (iii) calibrating each of the three components in the video output based on said differences, respectively, resulting in calibrated digital values;

video memory means for temporarily storing said calibrated digital values;

display means electrically connected to said video memory means for visually reproducing the electronically stored image;

means electrically connected to said video memory means and said display means for controlling output from said video memory means to said display means.

10. The device of claim 9 wherein:

said converting means comprises an analog-to-digital converter; and said correction means comprises means, electrically connected to said analog-to-digital converter and to said video memory means, for adding said differences, respectively, to digital values associated with the three components to yield said calibrated digital values, and for transmitting said calibrated digital values to said video memory means.

11. The device of claim 9 further comprising a digital-to-analog converter having three individually addressable outputs, wherein:

said converting means comprises three analog-to-digital converters, one for each color, each of said converters having an external voltage reference, said external voltage references being electrically connected to said addressable outputs of said digital-to-analog converter, respectively; and said correction means comprises means, electrically connected to each of said analog-to-digital converters, to said video memory means, and to said digital-to-analog converter, for biasing the reference voltages of said analog-to-digital converters.

12. The device of claim 9 wherein:

said converting means comprises a digital-to-analog converter having a digital input and an analog output, and three comparators each having a first input, a second input, and an output, said first inputs receiving the three analog components, respectively, said second inputs being electrically connected in parallel to said analog output of said digital-to-analog converter; and said correction means comprises means, electrically connected to said digital input of said digital-to-analog converter, to said outputs of said comparators, and to said video memory means, for adding said differences, respectively, to digital values associated with the three components to yield said calibrated digital values, and for transmitting said calibrated digital values to said video memory means.

13. The device of claim 9 further comprising means, remote from the device, for activating said correction means to determine said three digital reference values and to record said differences between said predetermined digital value and said digital reference values.

14. The device of claim 9 wherein the colors corresponding to the three components of the video output are primary colors.

15. The device of claim 9 wherein said display means comprises liquid crystal means for providing a light-transmissive image based on said calibrated digital values.

16. In a presentation system having an external source for transmitting three analog image signals, corresponding to the primary colors of an electronically stored color image, to a display device having means for reproducing the image, the improvement comprising:

means, in said source comprising interchangeable personal computers of different manufacture, for generating a test pattern having three electrical analog reference signals of maximum intensity, one for each of said primary colors;

means, in said display device, for converting analog voltage levels into digital values;

correction means, in said display device, electrically connected to said converting means and said reproducing means, for (i) determining three digital reference values corresponding to said three analog reference signals, respectively, (ii) recording the differences, respectively, between a predetermined digital value and said digital reference values, and (iii) calibrating each of said three analog image signals based on said differences, respectively.

17. The presentation system of claim 16 further comprising means for remotely activating said generating means and said corrections means to determine said three digital reference values and to record said differences between said predetermined digital value and said digital reference values.

18. The presentation system of claim 16 wherein:

said converting means comprises an analog-to-digital converter; and said correction means comprises means, electrically connected to said analog-to-digital converter and to said reproducing means, for adding said differences, respectively, to digital values associated with said three analog image signals to yield three calibrated digital values, and for transmitting said calibrated digital values to said reproducing means.

19. The presentation system of claim 16 further comprising a digital-to-analog converter having an input and three individually addressable outputs, said digital-to-analog converter located in said display device, wherein:

said converting means comprises three analog-to-digital converters, one for each primary color, each of said converters having an external voltage reference, said external voltage references being electrically connected to said addressable outputs of said digital-to-analog converter, respectively; and said correction means comprises means, electrically connected to each of said analog-to-digital converters, to said reproducing means, and to said input of said digital-to-analog converter, for biasing the reference voltages of said analog-to-digital converters based on said differences.

20. The presentation system of claim 16 wherein said display device comprises a liquid crystal display panel, and further comprising an overhead projector having a light-transmissive stage area, said liquid crystal display panel being located adjacent said stage area.

* * * * *